(12) United States Patent
Foss et al.

(10) Patent No.: US 11,092,470 B2
(45) Date of Patent: Aug. 17, 2021

(54) MAGNETIC FLOWMETER WITH NOISE ADAPTIVE DEAD TIME

(71) Applicant: Micro Motion Inc., Boulder, CO (US)

(72) Inventors: Scot R. Foss, Eden Prairie, MN (US); Andrew T. Kline, Eagan, MN (US)

(73) Assignee: Micro Motion Inc., Boulder, CO (US)

( * ) Notice: Subject to any disclaimer, the term of this patent is extended or adjusted under 35 U.S.C. 154(b) by 119 days.

(21) Appl. No.: 16/570,301

(22) Filed: Sep. 13, 2019

(65) Prior Publication Data

US 2021/0080299 A1    Mar. 18, 2021

(51) Int. Cl.
  *G01F 1/60*  (2006.01)
  *G01F 1/58*  (2006.01)
  *G01D 3/032* (2006.01)

(52) U.S. Cl.
  CPC .......... *G01F 1/60* (2013.01); *G01F 1/584* (2013.01); *G01D 3/032* (2013.01); *G01F 1/588* (2013.01)

(58) Field of Classification Search
None
See application file for complete search history.

(56) References Cited

U.S. PATENT DOCUMENTS

| | | | |
|---|---|---|---|
| 5,905,206 A | 5/1999 | Herwig et al. | |
| 6,594,613 B1* | 7/2003 | Ley | G01D 3/032 702/140 |
| 6,752,026 B1 | 6/2004 | Hyde | |
| 6,845,330 B2 | 1/2005 | Okuda et al. | |
| 9,182,258 B2 | 11/2015 | Rovner | |
| 9,429,454 B2 | 8/2016 | Gao et al. | |
| 2002/0117009 A1 | 8/2002 | Keech | |
| 2004/0024568 A1* | 2/2004 | Eryurek | G01F 1/8477 702/182 |
| 2005/0075803 A1 | 4/2005 | Budmiger et al. | |
| 2012/0130681 A1 | 5/2012 | Pride | |
| 2017/0989743 | 3/2017 | Machuca et al. | |

OTHER PUBLICATIONS

International Search Report and Written Opinion for International Patent Application No. PCT/US2020/049432, dated Dec. 17, 2020, 9 pages.

International Search Report and Written Opinion for International Patent Application No. PCT/US2020/049877, dated Dec. 15, 2020, 14 pages.

(Continued)

*Primary Examiner* — Harshad R Patel
(74) *Attorney, Agent, or Firm* — Christopher R. Christenson; Kelly, Holt & Christenson PLLC (57) ABSTRACT

A magnetic flowmeter includes at least one coil configured to generate a magnetic field within a process fluid flow. A pair of electrodes is configured to detect an electromotive force within the process fluid flow in response to the magnetic field. Measurement circuitry is operably coupled to the pair of electrodes and configured to provide an indication of the detected electromotive force. A processor is coupled to the measurement circuitry and is configured to receive the indication of the detected electromotive force and an indication of process noise. The processor is configured to change a dead time parameter based on the indication of process noise and provide a process fluid flow output based on the indication of detected electromotive force and the dead time parameter.

20 Claims, 6 Drawing Sheets

(56) References Cited

OTHER PUBLICATIONS

International Search Report and Written Opinion for International Patent Application No. PCT/US2020/049159, dated Dec. 8, 2020, 10 pages.
"High Process Noise Field Guide" retrieved from https://www.emerson.com/documents/automation/white-paper-high-process-noise-field-guide-rosemount-en-89368.pdf, Emerson Process Management. 2012, 4 pages.
U.S. Appl. No. 16/570,322, filed Sep. 13, 2019, Application and Drawings, 26 pages.
U.S. Appl. No. 16/570,328, filed Sep. 13. 2019, Application and Drawings, 18 pages.

\* cited by examiner

MAGNETIC FLOWMETER WITH NOISE ADAPTIVE DEAD TIME

BACKGROUND

Magnetic flowmeters (or magmeters) measure flow by application of Faraday's Law, an electromagnetic effect. The magnetic flowmeter energizes one or more coils by passing an excitation current through field windings which generate a magnetic field across an electrically isolated, conductive process fluid flow. An electromotive force (EMF) is generated by the flowing process fluid crossing through the magnetic field. This induced voltage (potential) both across the fluid and with respect to the rest of the process fluid can readily be measured by one or more conductive electrodes that contact the flowing process fluid. The volumetric flow is proportional to the flow velocity and the cross-sectional area of the flowtube. The flow velocity is directly proportional to the electrode voltage potential (EV), which is directly proportional to the induced magnetic field strength (B). The induced magnetic field strength is assumed to be proportional to the applied magnetic field (H), which is directly linked to the magnitude of the excitation current. Thus, a direct correlation is provided between the measured electrode voltage potential and indicated volumetric flow.

Magnetic flowmeters are useful in a variety of conductive and semi-conductive fluid flow measurement environments. In particular, the flow of water-based fluids, ionic solutions and other conducting fluids can all be measured using magnetic flowmeters. Further, magnetic flowmeters are often used with fluids that may contain solids, such as pulp used in paper processing. Thus, magnetic flowmeters can be found in water treatment facilities, beverage and hygienic food production, chemical processing, high purity pharmaceutical manufacturing, as well as hazardous and corrosive fluid processing facilities. However, some environments are more susceptible to signal noise. Providing a magnetic flowmeter with a better response to signal noise would improve the accuracy of the flow output when used in such noisy environments.

SUMMARY

A magnetic flowmeter includes at least one coil configured to generate a magnetic field within a process fluid flow. A pair of electrodes is configured to detect an electromotive force within the process fluid flow in response to the magnetic field. Measurement circuitry is operably coupled to the pair of electrodes and configured to provide an indication of the detected electromotive force. A processor is coupled to the measurement circuitry and is configured to receive the indication of the detected electromotive force and an indication of process noise. The processor is configured to change a dead time parameter based on the indication of process noise and provide a process fluid flow output based on the indication of detected electromotive force and the dead time parameter.

DETAILED DESCRIPTION OF ILLUSTRATIVE EMBODIMENTS

Figure 1:
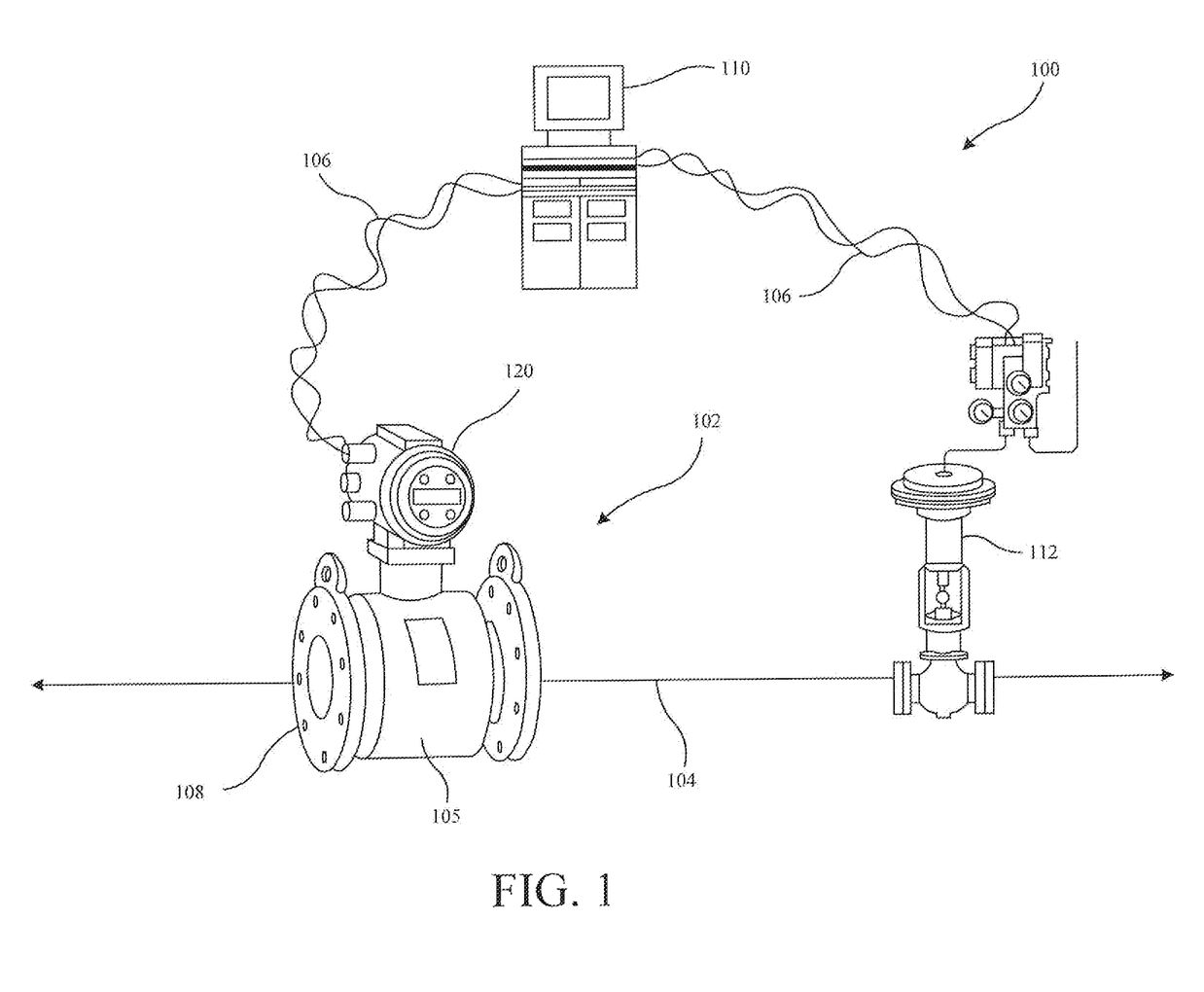
FIG. 1 is a diagrammatic view of an environment in which magnetic flowmeters in accordance with embodiments of the present invention are useful.

FIG. 1 illustrates a typical environment 100 for magnetic flowmeter 102. Magnetic flowmeter 102 is coupled to process piping, illustrated diagrammatically at line 104 that also couples to control valve 112. Magnetic flowmeter 102 is configured to provide a flow rate output relative to process fluid flow through piping 104 in a process. Examples of such fluids include slurries and liquids in chemical, pulp, pharmaceutical and other fluid processing plants.

Magnetic flowmeter 102 includes electronics housing 120 connected to flowtube 108. Magnetic flowmeter 102 outputs are configured for transmission over relatively long distances to a controller or indicator via process communication connection 106. In typical processing plants, communication connection 106 can employ a digital communication protocol, an analog communication signal, or a combination thereof. The same or additional process information can be made available via wireless communication, pulse width or frequency output, or discrete input/outputs (DI/DO). System controller 110 can display flow information for a human operator as well as provide control signals over process communication connection 106 in order to control the process using control valves, such as valve 112.

Figure 2:
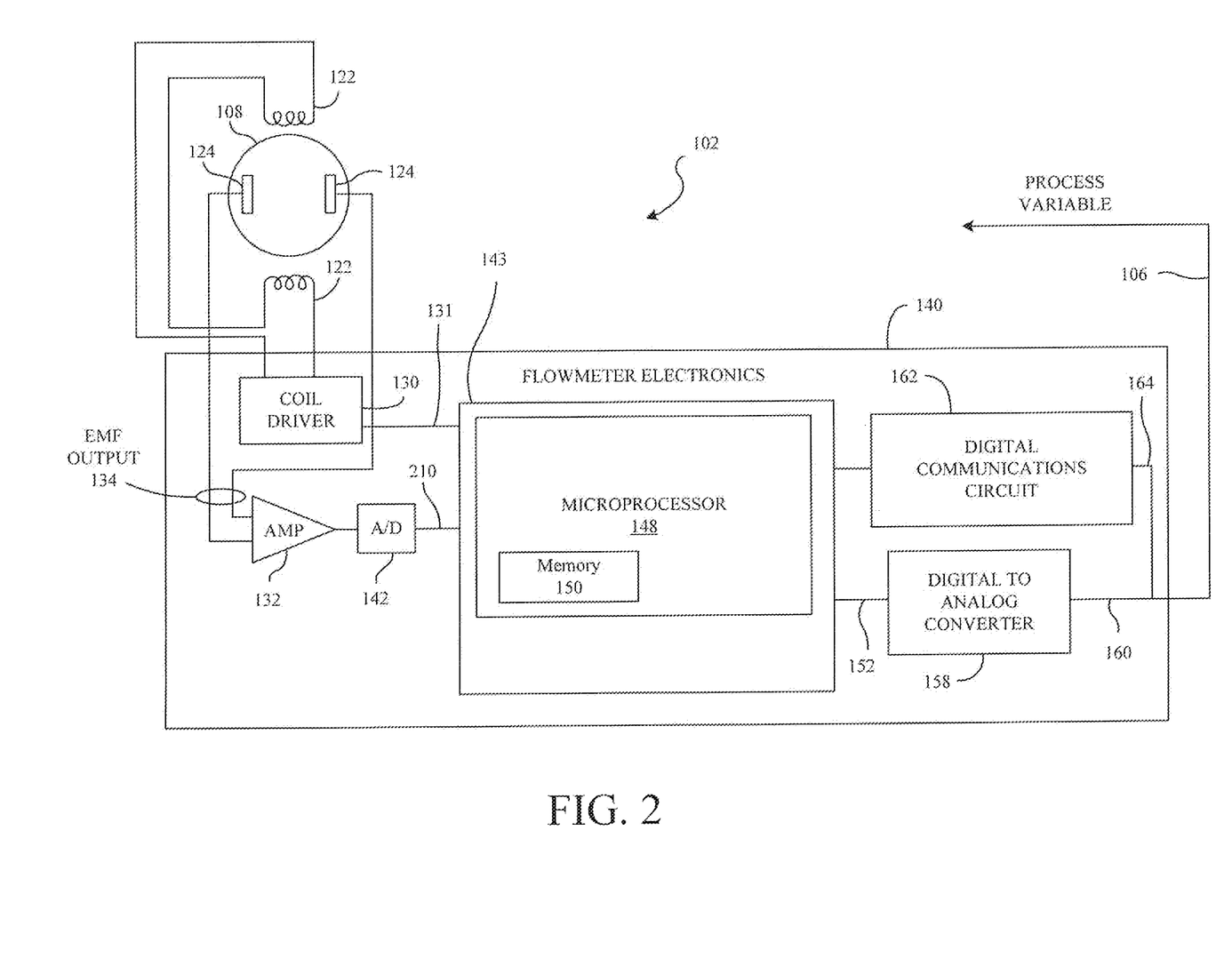
FIG. 2 is a block diagram of a magnetic flowmeter in accordance with an embodiment of the present invention.

FIG. 2 is a block diagram of magnetic flowmeter 102 with which embodiments of the present invention are particularly applicable. Magnetic flowmeter 102 measures a flow of conductive process fluid through flowtube assembly 108. Coils 122 are configured to apply an external magnetic field in the fluid flow in response to an applied excitation current from coil driver 130. EMF sensors (electrodes) 124 electrically couple to the fluid flow and provide an EMF signal output 134 to amplifier 132 related to an EMF generated in the fluid flow due to the applied magnetic field, fluid velocity, and noise. Analog-to-digital converter 142 provides a digitized EMF signal to microprocessor system 148 of flowmeter electronics 143.

Microprocessor 148 may be configured, through hardware, software, or a combination thereof, to provide digital signal processing functions relative to EMF output 134 in order to provide an output 152 related to fluid velocity. Further, as will be described in greater detail below, the signal processing can provide improved noise rejection. Microprocessor 148 may include or be coupled to memory 150 that contains instructions that, when executed by microprocessor 148, provide process fluid flow velocity output calculation as well as improved noise reduction in accordance with embodiments described herein.

Microprocessor 148 calculates fluid flow velocity through flowtube 108 in accordance with a relationship between the EMF output 134 and flow velocity as described in an application of Faraday's Law:

$$V = E/kBD$$

Where E can be the signal output 152 which is related to the EMF output 134, V is the velocity of the fluid, D is the diameter of flowtube 108, B is the strength of the induced magnetic field in the process fluid, and k is a constant of proportionality. Microprocessor 148 uses velocity and the measured magnetic field or coil current to calculate flow of the process fluid in accordance with known techniques. A digital-to-analog converter 158 is coupled to microprocessor 148 of flowmeter electronics 143 and generates an analog transmitter output 160 for coupling to communication bus 106. A digital communication circuit 162 may generate a digital transmitter output 164. The analog output 160 and/or digital output 164 can be coupled to process controllers or monitors, as desired.

Noisy process flow can cause magnetic flowmeter measurement errors that can result in process control difficulties. This is because it is sometimes possible for the noisy flow to generate erroneous process flow outputs, which outputs may appear to a control system as changing flow, which may adjust the process based on the erroneous flow. To solve noise problems, magnetic flowmeters, especially those used in noisy process flow environments, generally employ damping, signal processing, and averaging. These techniques increase output stability but sometimes reduce the responsiveness of the magnetic flowmeter to changes in process fluid flow. In order to address this potential lack of responsiveness, a Dead Time counter is generally employed.

As used herein, Dead Time is a signal processing parameter that, when engaged, causes the flow output to no longer be a function of an average, but to instead follow the flow value more closely. In one example, if a flow output is an average of ten previous flow samples, when a Dead Time engages, the flow output may be an average of 2 or 3 samples or may even be provided as the flow sample itself.

As can be appreciated, properly setting the Dead Time trigger is very important for balancing accurate flow indication with effective noise rejection. The Dead Time counter diagnostic triggers when it detects a change in flow. Dead Time counters, however, are not immune to noise. It is possible for false positives to occur that can cause the flow to jump to an incorrect flowrate. This change in reported flow may cause the control system to react in an undesired manner. To reduce the possibility of noise-reduced false positives, the flow threshold trigger for the Dead Time is sometimes increased. However, increasing the threshold for the Dead Time trigger reduces responsiveness, which is the main reason for using the Dead Time in the first place.

Figure 3:
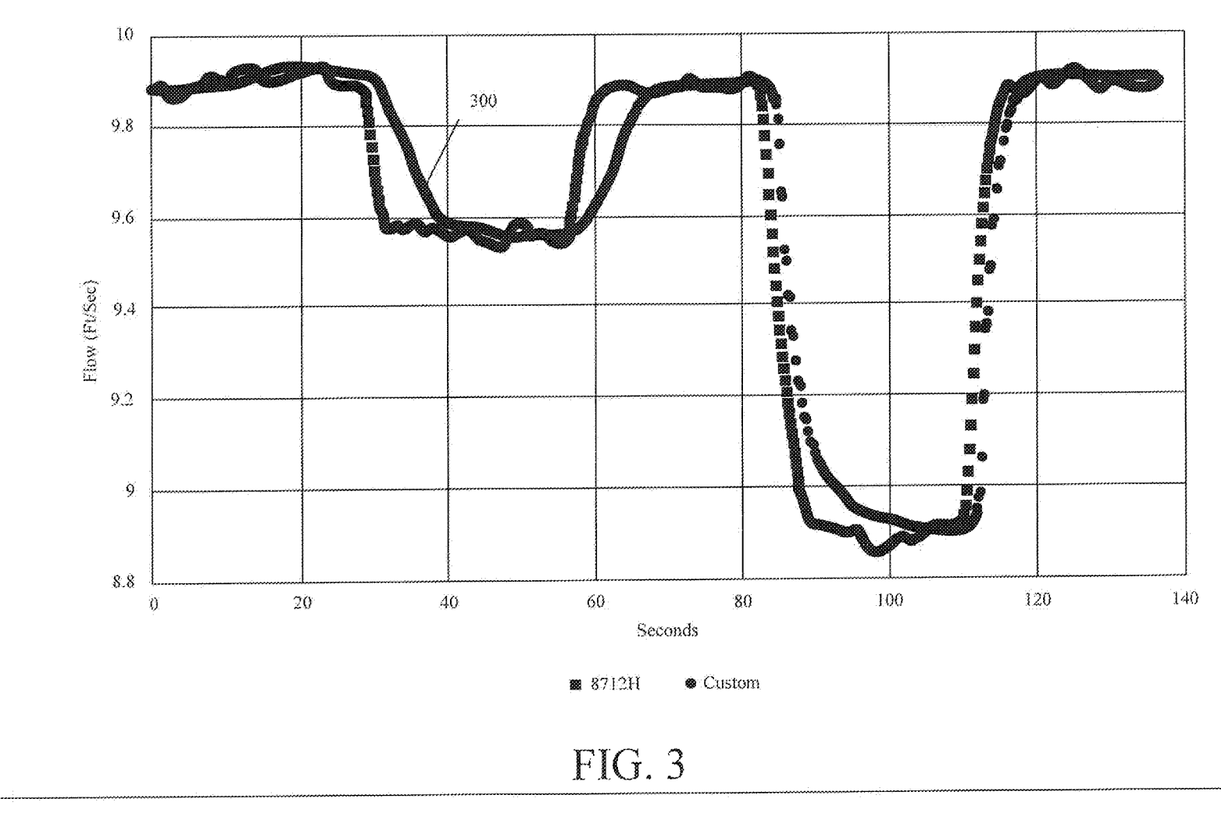
FIG. 3 is a chart contrasting a pair of signals in order to illustrate the operation of Dead Time.

FIG. 3 illustrates an example of a highly averaged flow signal along with a damped flow signal. The larger down step shows a flow change where the highly averaged signal 300 causes a Dead Time engagement, but not a second engagement due to the threshold being too high. On the larger up step, the highly averaged flow signal 300 tracks with the damped flow signal due to the transition being within the Dead Time limit. As can be seen, when the Dead Time works correctly, the highly average signal tracks very closely to the minimally damped signal. In essence, a magnetic flowmeter employing Dead Time has a first mode wherein the process fluid flow output may be significantly averaged, smoothed, or otherwise processed to provide a signal that is robust against process noise. The magnetic flowmeter also has a second mode that decouples the process flow output from the averaged, smoothed or otherwise processed signal to generate a signal that can follow the changing process fluid flow samples more closely. This second mode is the Dead Time mode and it is engaged when the process flow samples exceed a Dead Time threshold for a duration beyond a Dead Time duration.

In accordance with embodiments described herein, an adaptive Dead Time is provided for a magnetic flowmeter in order to reduce the probability of false positives. In one embodiment, the Dead Time calculation may use an interquartile mean (IQM) to reduce large spike noise on the flow signal. An interquartile mean is a calculation where data in the second and third quartiles is used (as in the interquartile range), and the lowest 25% and the highest 25% of the data samples are discarded. Then, either a median absolute deviation (MAD) or a standard deviation is used to configure or otherwise influence the Dead Time threshold. Accordingly, when more signal noise is present, the MAD and the standard deviation increase.

MAD is a mathematically known calculation that is robust against outliers. MAD is generally believed to be more resistant to outliers in a data set than standard deviation. While in standard deviation, the distances from the mean are squared, in median absolute deviation, the deviations of a small number of outliers are irrelevant. MAD is calculated by first computing a median for a group of samples. Then the deviation of each sample from the median is calculated. Finally, the median of the sample deviations is calculated to provide the MAD. As an example, consider the data (2, 2, 4, 4, 8, 12, 18). It has a median value of 4. The absolute deviations about 4 are (2, 2, 0, 0, 4, 8, 14) which in turn have a median value of 2 (because the sorted absolute deviations are (0, 0, 2, 2, 4, 8, 14)). So, the median absolute deviation for this data is 2.

When the noise decreases, so will the MAD and the standard deviation, causing the threshold to decrease as well. This provides a robust Dead Time by increasing the threshold when noise is present and decreasing the threshold when noise is not present. The adaptive Dead Time diagnostic also maximizes responsiveness by reducing the flow threshold when noise is present. While use of MAD and/or standard deviation is preferred, embodiments described herein can be practiced using any suitable indication of process noise. For example, a separate device could be configured to measure the noise and communicate an indication of process noise to the magnetic flowmeter, which then adapts the Dead Time based on the communicated noise. In another example, a Fast Fourier Transform (FFT) could be used to measure the amount of noise on the electrodes in order to configure or otherwise influence the Dead Time threshold.

Figure 4:
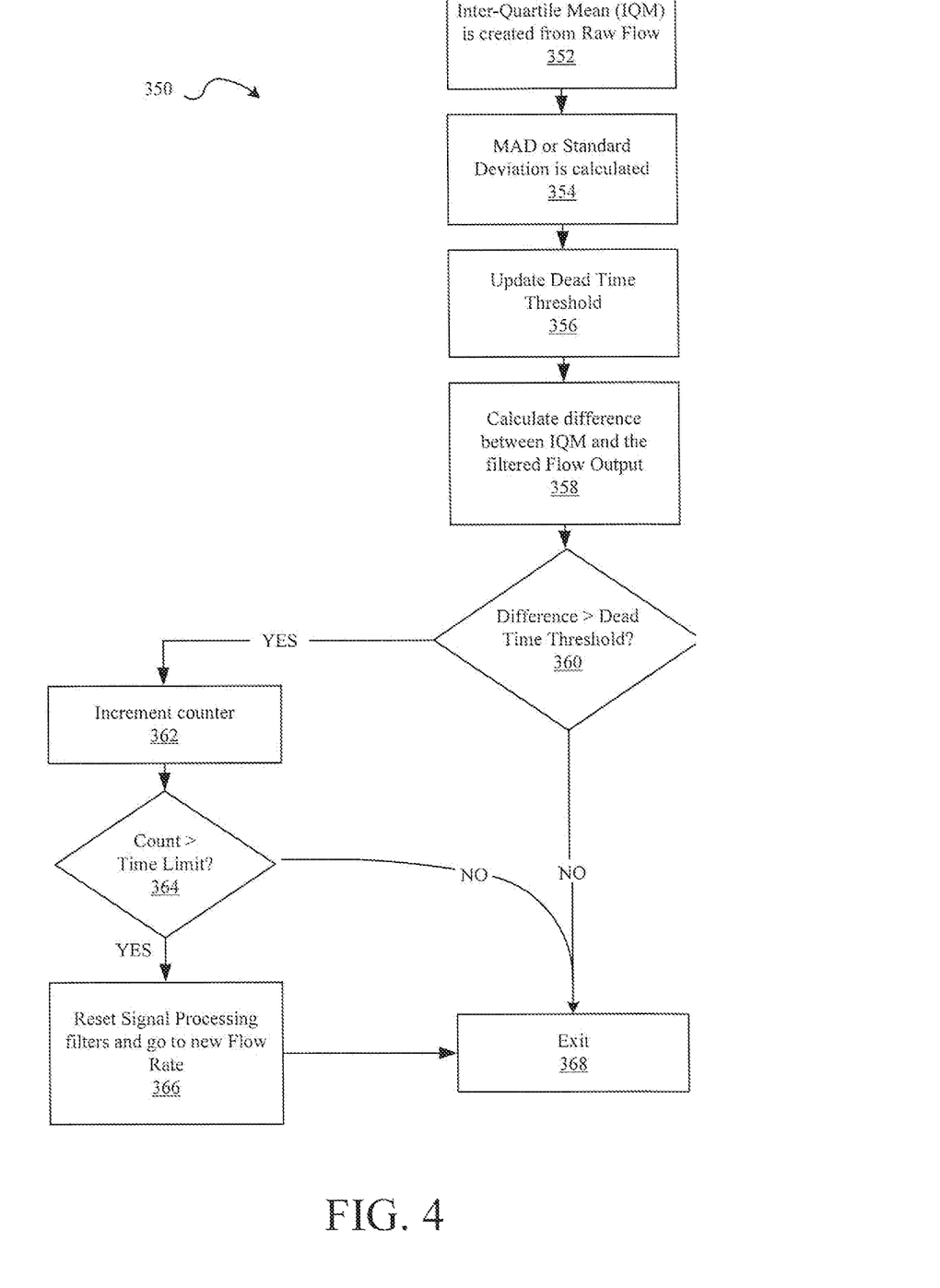
FIG. 4 is a flow diagram of a method of dynamically modifying a Dead Time threshold in a magnetic flowmeter in accordance with an embodiment of the present invention.

FIG. 4 is a flow diagram of a method of dynamically modifying a Dead Time threshold in a magnetic flowmeter in accordance with an embodiment of the present invention. The main addition to a Dead Time counter is using an IQM to compare the filtered output, creating a flow threshold to surpass before counting, and generating a noise deterministic metric to modify the threshold.

Method 350 begins at block 352, where an interquartile mean value is generated from raw flow figures from the magnetic flowmeter. These raw flow figures are individual EMF measurements from electrodes 124 from the magnetic flowmeter provided by analog-to-digital converter 142. Once the IQM is created, control passes to block 354 where a statistical parameter of the raw flow values is generated. The statistical parameter may be, in one example, median absolute deviation (MAD) or standard deviation. Next, at block 356, the Dead Time threshold is updated. At block 358, a difference is calculated between the IQM and the filtered flow output. At block 360, processor 148 determines whether the difference calculated at block 358 is greater than the Dead Time threshold. If so, then control passes to block 362 where the Dead Time counter is incremented. If, however, the difference is not greater than the Dead Time threshold, then control passes to block 368 and the method ends. When the Dead Time counter is incremented at block 362, block 364 is executed to determine whether the count is greater than a Dead Time limit. If the count is greater than the Dead Time limit, then control passes to block 366 where signal processing filters are reset, and the process flow output is set as the new flow rate. Then, control passes to block 368 where the method ends.

Figure 5:
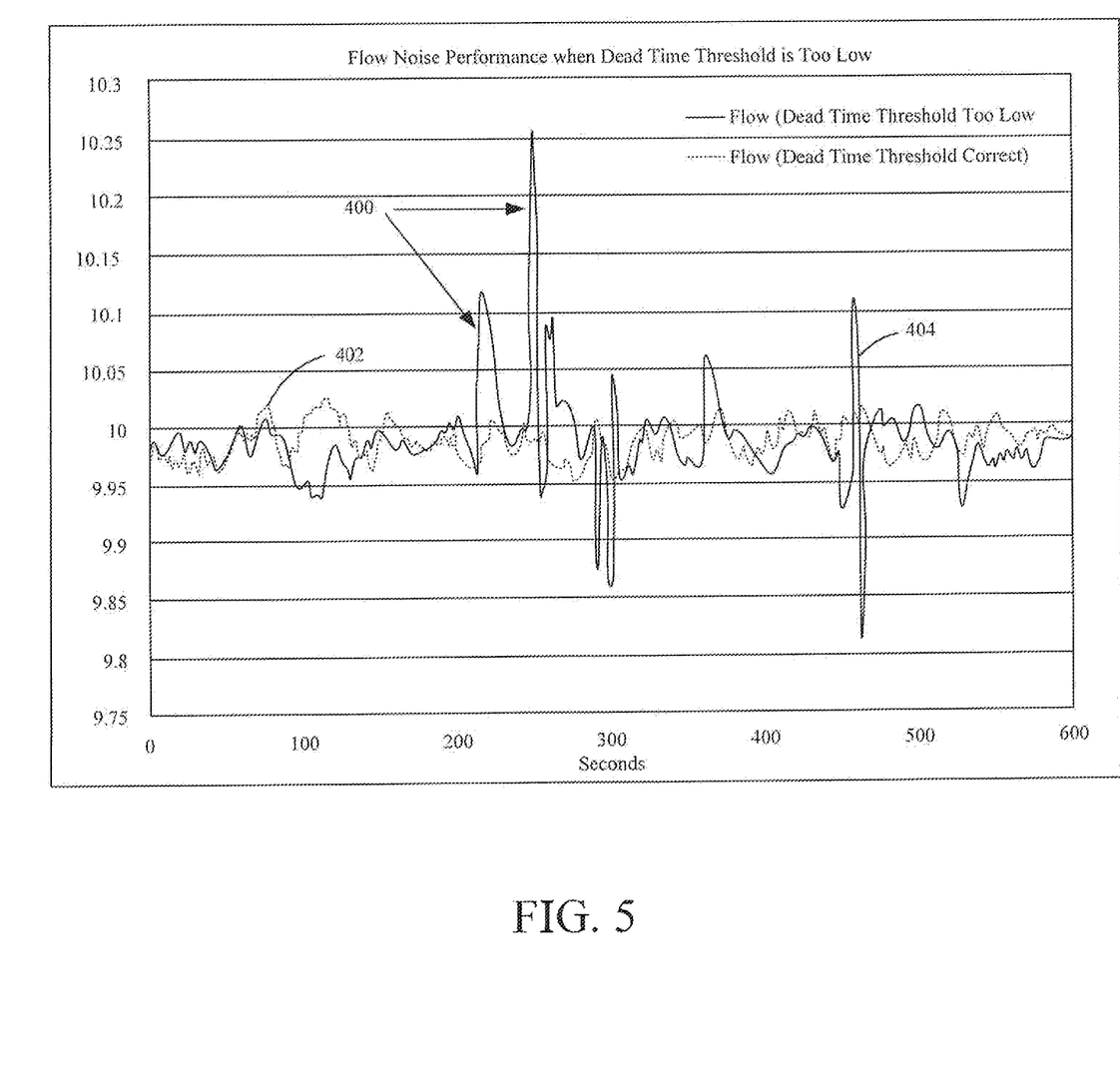
FIG. 5 is a graph illustrating Dead Time threshold effects on a flow output signal.

FIG. 5 is a graph illustrating Dead Time threshold effects on a flow output signal. FIG. 5 shows flow when the Dead Time threshold is too low (illustrated at reference numeral 400) and the Dead Time limit triggers incorrectly and large spikes are seen on the flow output. Conversely, FIG. 5 also shows an example where the Dead Time is set correctly, at signal line 402 where the false positives illustrated at reference numeral 400, and 404 do not generate the same flow output aberrations.

Figure 6:
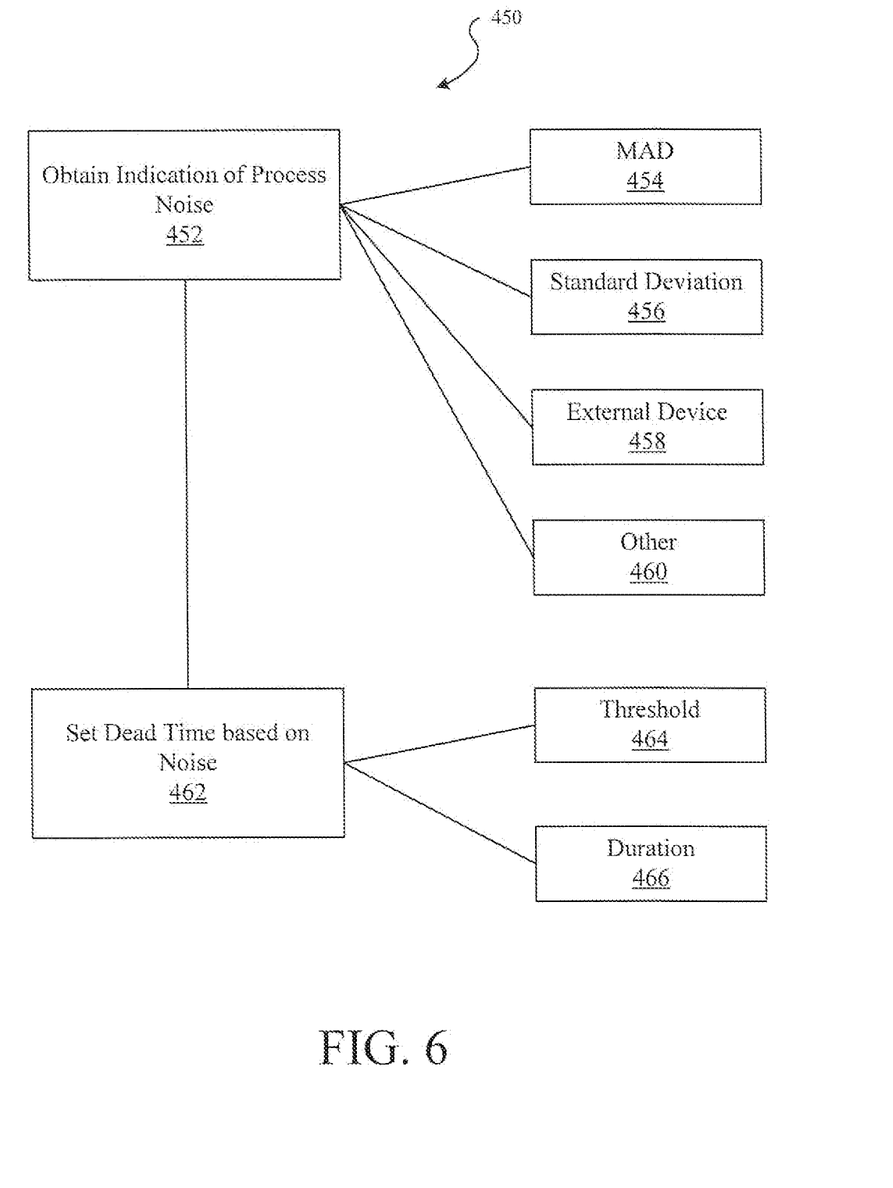
FIG. 6 is a flow diagram of a method of dynamically changing Dead Time in a magnetic flowmeter in accordance with an embodiment of the present invention.

FIG. 6 is a flow diagram of a method of dynamically changing Dead Time in a magnetic flowmeter in accordance with an embodiment of the present invention. Method 450 may be performed periodically or upon receiving a command to do so. For example, method 450 may be performed in response to process communication received by magnetic flowmeter 102. Similarly, method 450 may be performed in response to user input.

Method 450 begins at block 452 where processor 148 obtains an indication of process noise. This indication can be from one or more suitable sources. For example, processor 148 may calculate a median absolute deviation (MAD) of a set of emf measurements from electrodes 124, as indicated at reference numeral 454. Additionally, or alternatively, processor 148 may calculate a standard deviation of a set of emf measurements from electrodes 124, as indicated at reference numeral 456. As indicated at reference numeral 458, the indication of process noise may also be received from an external device. Other suitable techniques for providing processor 148 with an indication of process noise can also be used, as indicated at reference numeral 460. While different techniques have been described for generating or obtaining an indication of process noise, it is also expressly contemplated that combinations thereof may also be used.

At block 462, processor 148 sets one or more Dead Time parameters based on the indication of process noise. As indicated at reference numeral 464, processor 148 may set a dead time threshold based on the indication of process noise. For example, the threshold could be set to be a standard deviation away from the current process fluid output value. In another example, the threshold could be set based on a function of the median absolute deviation. Additionally, or alternatively, the dead time duration can also be changed by processor 148 as indicated at reference numeral 466. Thus, embodiments disclosed herein are able to dynamically adjust dead time parameters to provide a better balance of accuracy and speed without sacrificing process fluid flow measurement accuracy. This allows better process control especially in environments having noisy processes.

Although the present invention has been described with reference to preferred embodiments, workers skilled in the art will recognize that changes may be made in form and detail without departing from the spirit and scope of the invention.

What is claimed is:
1. A magnetic flowmeter, comprising:
   at least one coil configured to generate a magnetic field within a process fluid flow;
   a pair of electrodes configured to detect an electromotive force within the process fluid flow in response to the magnetic field;
   measurement circuitry operably coupled to the pair of electrodes and configured to provide an indication of the detected electromotive force; and
   a processor coupled to the measurement circuitry and configured to receive the indication of the detected electromotive force and an indication of process noise, the processor being configured to change a dead time parameter based on the indication of process noise and provide a process fluid flow output based on the indication of detected electromotive force and the dead time parameter.

2. The magnetic flowmeter of claim 1, wherein the dead time parameter is a dead time threshold.

3. The magnetic flowmeter of claim 2, wherein the process fluid flow output has a first smoothing level when the detected electromotive force is below the dead time threshold and a second smoothing level when the detected electromotive force is above the dead time threshold.

4. The magnetic flowmeter of claim 1, wherein the processor is configured to obtain the indication of process noise using a statistical parameter on a plurality of detected electromotive force indications.

5. The magnetic flowmeter of claim 4, wherein the statistical parameter is median absolute deviation.

6. The magnetic flowmeter of claim 4, wherein the statistical parameter is standard deviation.

7. The magnetic flowmeter of claim 1, wherein the processor is configured to use an interquartile mean to reject outliers to stabilize the process fluid flow output.

8. The magnetic flowmeter of claim 1, wherein the processor is configured to obtain the indication of process noise from an external device.

9. The magnetic flowmeter of claim 1, wherein the dead time parameter is dead time duration.

10. The magnetic flowmeter of claim 1, wherein the processor is configured to obtain the indication of process noise using a fast fourier transform.

11. A method of operating a magnetic flowmeter, the method comprising:
    receiving an indication of process noise; and
    changing at least one dead time parameter in the magnetic flowmeter based on the indication of process noise.

12. The method of claim 11, wherein receiving an indication of process noise is performed for each process fluid flow measurement of the magnetic flowmeter.

13. The method of claim 11, wherein receiving an indication of process noise is performed periodically.

14. The method of claim 11, wherein receiving an indication of process noise includes calculating a median absolute deviation of an interquartile mean of a set of raw flow measurements.

15. The method of claim 11, wherein receiving an indication of process noise includes calculating a standard deviation of an interquartile mean of a set of raw flow measurements.

16. The method of claim 11, wherein receiving an indication of process noise includes receiving an indication of process noise from an external device.

17. The method of claim 11, and further comprising detecting an electromotive force between a pair of electrodes of the magnetic flowmeter and providing a process fluid flow output based on the detected electromotive force and the at least one dead time parameter.

18. A method of operating a magnetic flowmeter, the method comprising:
- receiving a set of measurements of electromotive force between a pair of electrodes of the magnetic flowmeter, the set of measurements being indicative of raw fluid flow over a defined period of time;
- creating an interquartile mean of the set of measurements;
- statistically processing the interquartile mean to obtain an indication of process noise;
- changing a dead time parameter of the magnetic flowmeter based on the indication of process noise;
- generating a filtered output based;
- determining whether a difference between the interquartile mean and the filtered output exceeds a threshold and selectively incrementing a counter if so; and
- determining whether the counter exceeds a time limit and selectively setting a new flow rate output and resetting signal processing filters if the counter time exceeds the time limit.

19. The method of claim 18, wherein statistically processing the interquartile mean includes calculating a standard deviation of the interquartile mean.

20. The method of claim 18, wherein statistically processing the interquartile means includes calculating a median absolute deviation of the interquartile mean.

\* \* \* \* \*